(12) United States Patent
Jackson et al.

(10) Patent No.: US 10,814,562 B2
(45) Date of Patent: Oct. 27, 2020

(54) EDGE DAMS FOR FABRICATION OF COMPOSITE PARTS

(71) Applicant: The Boeing Company, Chicago, IL (US)

(72) Inventors: Cori Amanda Jackson, St Louis, MO (US); Randall D. Wilkerson, O'Fallon, MO (US); Garrett Denard Williams, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 15/927,480

(22) Filed: Mar. 21, 2018

(65) Prior Publication Data

US 2019/0291352 A1 Sep. 26, 2019

(51) Int. Cl.
| | |
|---|---|
| *B29C 65/36* | (2006.01) |
| *B29C 65/00* | (2006.01) |
| *B29C 70/30* | (2006.01) |
| *B29C 65/34* | (2006.01) |
| *B29L 31/30* | (2006.01) |

(52) U.S. Cl.
CPC ...... *B29C 65/3656* (2013.01); *B29C 65/3456* (2013.01); *B29C 66/73112* (2013.01); *B29C 70/30* (2013.01); *B29C 66/73111* (2013.01); *B29C 66/8185* (2013.01); *B29L 2031/3076* (2013.01)

(58) Field of Classification Search
CPC ............... B29C 70/30; B29C 66/73111; B29C 66/73112; B29C 66/8185
See application file for complete search history.

(56) References Cited

U.S. PATENT DOCUMENTS

| | | | |
|---|---|---|---|
| 8,182,644 B2 * | 5/2012 | Siegel | B32B 27/08 156/307.1 |
| 2015/0314494 A1* | 11/2015 | Arnaud | B29C 70/46 524/1 |
| 2017/0326808 A1 | 11/2017 | Kizhakkepat et al. | |

* cited by examiner

*Primary Examiner* — Carson Gross
(74) *Attorney, Agent, or Firm* — Duft & Bornsen, PC

(57) ABSTRACT

Systems and methods are provided for composite part fabrication. One embodiment is a method that includes placing a laminate onto a base of a mandrel between side walls of the mandrel, placing edge dams between the side walls and the laminate that each abut the laminate and abut one of the side walls, each edge dam having a Coefficient of Thermal Expansion (CTE) greater than a CTE of the mandrel, the CTE of the mandrel being greater than a CTE of the laminate, heating the laminate, edge dams, and mandrel, and during the heating, thermally expanding the edge dams an amount that corresponds with a difference in thermal expansion between the laminate and the mandrel.

20 Claims, 7 Drawing Sheets

EDGE DAMS FOR FABRICATION OF COMPOSITE PARTS

FIELD

The disclosure relates to the field of composite parts, and in particular, to the fabrication of composite parts.

BACKGROUND

When fabricating carbon fiber parts, the application of heat necessarily results in fabrication components such as mandrels, and the composite part itself, changing shape due to thermal expansion. Some materials experience a great degree of expansion, while other materials experience negligible amounts. When fabricating composite parts, the various components are necessarily made of different materials and have different shapes. Hence, they necessarily change shape in different ways (and by different amounts) during thermal expansion and contraction. For example, a mandrel for a composite part may shrink faster than the composite part itself. This applies crushing forces to the composite part that result in internal stresses which are not desired.

Therefore, it would be desirable to have a method and apparatus that take into account at least some of the issues discussed above, as well as other possible issues.

SUMMARY

Embodiments described herein provide edge dams which are placed between mandrels and composite parts, and which are designed to thermally expand in a manner that prevents the mandrel from crushing a composite part while still providing support for the composite part. This prevents internal stresses from being applied to the composite part during its formation, which enhances the overall strength of the composite part.

One embodiment is a method that includes placing a laminate onto a base of a mandrel between side walls of the mandrel, placing edge dams between the side walls and the laminate that each abut the laminate and abut one of the side walls, each edge dam having a Coefficient of Thermal Expansion (CTE) greater than a CTE of the mandrel, the CTE of the mandrel being greater than a CTE of the laminate, heating the laminate, edge dams, and mandrel. The method also includes, during the heating, thermally expanding the edge dams an amount that corresponds with a difference in thermal expansion between the laminate and the mandrel.

A further embodiment is an apparatus having a mandrel having a base as well as side walls, and a laminate placed onto the base between the side walls. The mandrel has a Coefficient of Thermal Expansion (CTE) greater than a CTE of the laminate. Edge dams are placed between the side walls and the laminate. Each edge dam abuts the laminate and abuts one of the side walls, and each edge dam has a CTE greater than the CTE of the mandrel.

A further embodiment is a method that includes compensating for a disparity in thermal expansion between a laminate having a first Coefficient of Thermal Expansion (CTE), and a mandrel having a second CTE, by placing edge dams between the mandrel and the laminate that each abut the laminate and abut the mandrel, each edge dam having a third CTE that is greater than the first CTE exhibited by the laminate and less than the second CTE exhibited by the mandrel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
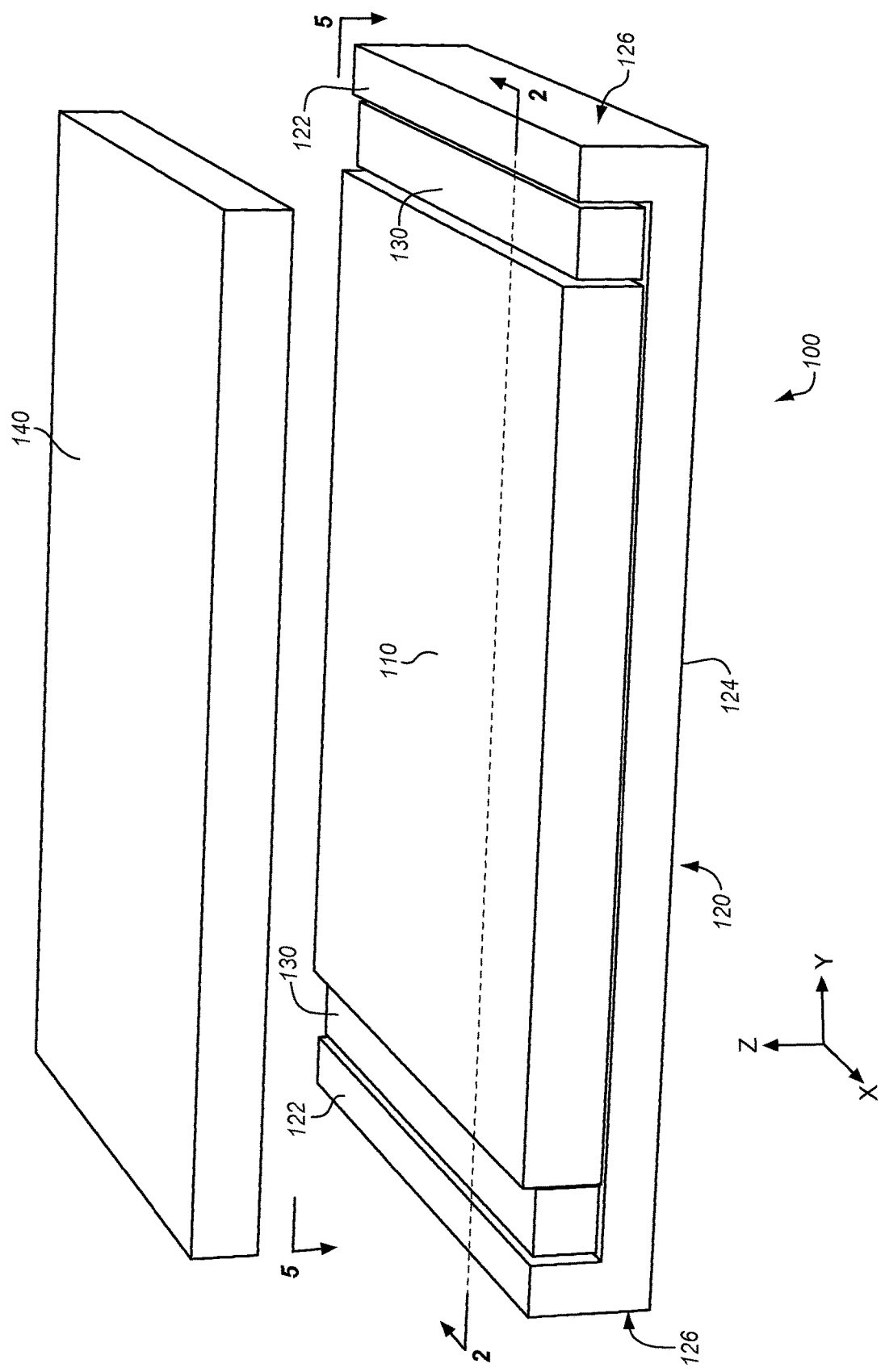
FIG. 1 is a perspective view of a composite fabrication system in an illustrative embodiment.

FIG. 1 is a perspective view of a composite fabrication system 100 in an illustrative embodiment. Composite fabrication system 100 heats a laminate 110 which has been placed onto a base 124 of mandrel 120, and then shapes the laminate 110 by pressing it between mandrel 120 and mandrel 140. When the laminate 110 is cooled, it forms a composite part having a desired shape.

In this embodiment, composite fabrication system 100 has been enhanced with edge dams 130. Edge dams 130 are inserted between laminate 110 and side walls 122 of mandrel 120 (which are located at sides 126 of mandrel 120). Without edge dams 130, mandrel 120 would expand and contract at a higher rate than laminate 110 with respect to the Y direction. This would cause unhardened resin to leak out of laminate 110 if laminate 110 remained shorter than the distance between side walls 122. Alternatively, it would cause side walls 122 to apply stresses to laminate 110 if laminate 110 was longer along the Y direction than the distance between side walls 122. Because mandrel 120 and laminate 110 expand and contract at different rates in response to changes in temperature, it is not possible to simply adjust the distance between side walls 122 to account for these issues. Mandrel 120 and laminate 110 may be heated, for example, from room temperature to seven hundred and twenty five degrees Fahrenheit (° F.) during curing, resulting in substantial changes in size.

Edge dams 130 address this problem because they each have a Coefficient of Thermal Expansion (CTE) and geometry that causes them to thermally expand and contract along the Y direction in a manner that corresponds with the difference in thermal expansion between laminate 110 and mandrel 120. Thus, regardless of the differences in thermal expansion between laminate 110 and mandrel 120, edge dams 130 continue to abut both laminate 110 and mandrel 120. Phrased another way, edge dams 130 may continuously abut both laminate 110 and mandrel 120 during heating. This ensures that laminate 110 remains structurally supported while it is being fabricated, while also ensuring that laminate 110 does not receive external stresses along the Y direction.

Figure 2:
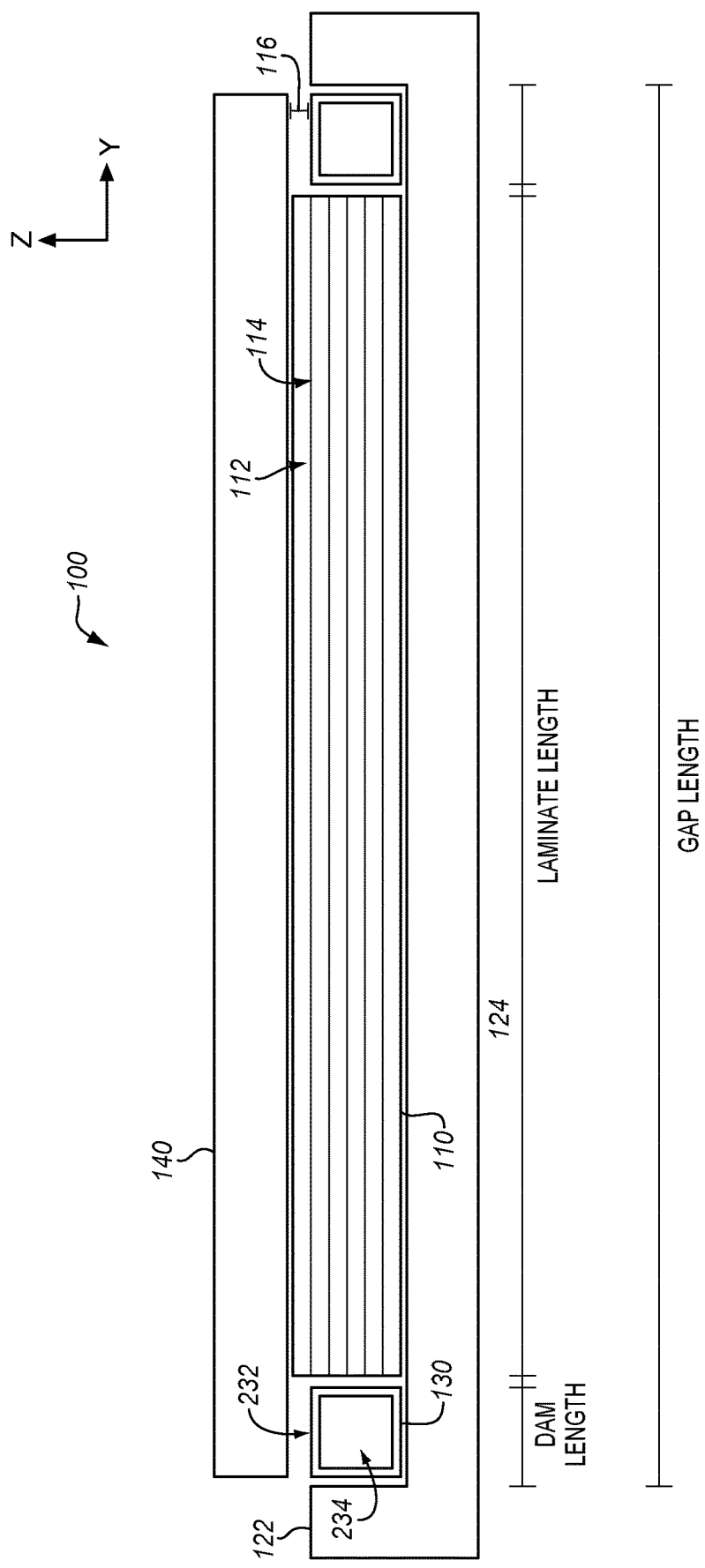
FIG. 2 is a cut-through view of a composite fabrication system in an illustrative embodiment.

FIG. 2 is a cut-through view of composite fabrication system 100 in an illustrative embodiment. FIG. 2 corresponds with view arrows 2 of FIG. 1. In this embodiment, mandrel 140 has been brought into contact with laminate 110. As shown in FIG. 2, laminate 110 is divided into layers 116, which each include a thermoplastic resin 112, as well as fibers 114. Edge dams 130 may include a flexible seal 232, such as a Kapton film or rubberized material. Edge dams 130 also include material 234. In embodiments where material 234 may melt during the fabrication process, flexible seal 232 ensures that material 234 does not leak. For the range of temperatures between the glass transition point of thermoplastic resin 112 and the melting point of thermoplastic resin 112, material 234 has a CTE that is much greater than the CTE of mandrel 120. For example, material 234 may have a CTE that is between five and fifty times (e.g., between ten and thirty times) that of mandrel 120. In one embodiment, thermoplastic resin 112 comprises a polyether ether ketone (PEEK) resin, material 234 comprises a PEEK resin, and mandrel 120 comprises steel. Thus, thermoplastic resin 112 and material 234 may comprise the same type of resin in some embodiments. In further embodiments, material 234 may comprise a sealed portion of thermoplastic resin. In still further embodiments, edge dams 130 may each comprise a glass rope seal.

FIG. 2 also illustrates that, for a default temperature, such as room temperature, laminate 110 exhibits a length in the Y direction ("laminate length"), edge dams 130 exhibit a length in the Y direction ("dam length"), and side walls 122 exhibit a distance between each other in the Y direction ("gap length"). Each of these distances changes during heating and cooling of composite fabrication system 100. While the term "length" is used herein, any suitable dimension (e.g., length, width, depth) or combination thereof may be suitable for the systems and techniques described below.

Illustrative details of the operation of composite fabrication system 100 will be discussed with regard to FIG. 3. Assume, for this embodiment, that mandrel 120 is in position and is ready to receive a laminate.

Figure 3:
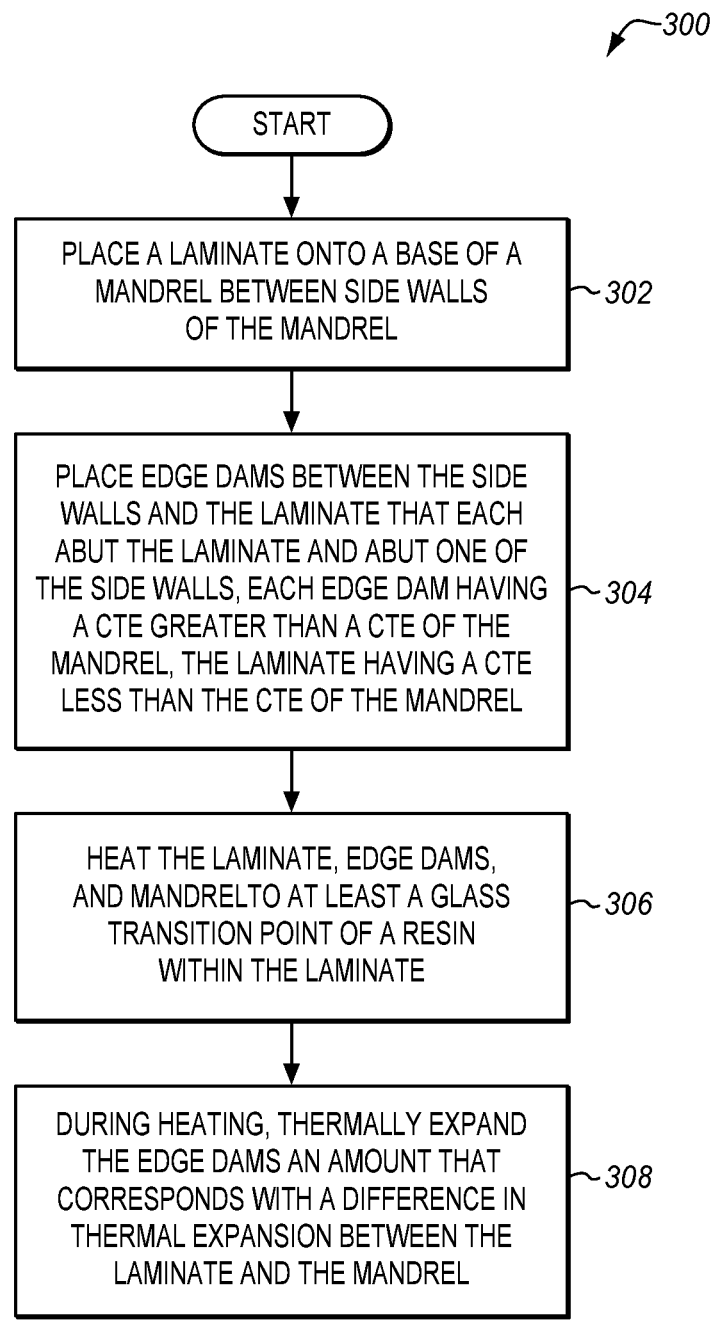
FIG. 3 is a flowchart illustrating a method for utilizing edge dams of a composite fabrication system in an illustrative embodiment.

FIG. 3 is a flowchart illustrating a method 300 for utilizing edge dams of a composite fabrication system in an illustrative embodiment. The steps of method 300 are described with reference to composite fabrication system 100 of FIG. 1, but those skilled in the art will appreciate that method 300 may be performed in other systems. The steps of the flowcharts described herein are not all inclusive and may include other steps not shown. The steps described herein may also be performed in an alternative order.

Laminate 110 is placed (e.g., laid-up) onto base 124 of mandrel 120, between side walls 122 which are located at sides 126 of mandrel 120 (step 302). Edge dams 130 are placed between side walls 122 and laminate 110, such that each edge dam abuts one of the side walls (step 304). As discussed above, each edge dam 130 has a CTE greater than a CTE of mandrel 120, and laminate 110 has a CTE less than the CTE of mandrel 120. This means that during thermal expansion, edge dams 130 will grow faster than the rest of composite fabrication system 100. In a similar fashion, during thermal contraction, edge dams 130 will shrink faster than the rest of composite fabrication system 100.

With laminate 110 and edge dams 130 placed onto mandrel 120, composite fabrication system 100 may be moved to a suitable location (e.g., an oven or autoclave) and heated. The heating process evenly heats laminate 110, edge dams 130, and mandrel 120. For thermoplastic resins, the heating process increases a temperature of thermoplastic resin 112 to a glass transition point, and then to a melting point. Thus, thermoplastic resin 112 may flow freely within laminate 110. This heating also results in thermal expansion. In further embodiments, thermoset resins may be used instead of thermoplastic resin 112. In such embodiments, the thermoset resin may be heated to a curing temperature at which it solidifies/cures. In order to ensure that resin remains at laminate 110 during heating, edge dams 130 thermally expand by an amount that corresponds with the difference in thermal expansion (along the Y direction) between laminate 110 and mandrel 120 (step 308). In this manner, edge dams 130 continue to abut both laminate 110 and side walls 122 throughout the heating process. In a similar fashion, during cooling, the side walls 122 shrink by an amount that corresponds with the difference in thermal expansion (along the Y direction) between laminate 110 and mandrel 120. Phrased another way, the thermal expansion difference between the laminate 110 and the mandrel 120 is compensated for by edge dams 130, owing to their material and shape. This ensures that side walls 122 do not apply stresses to laminate 110 during cooling.

Figure 4:
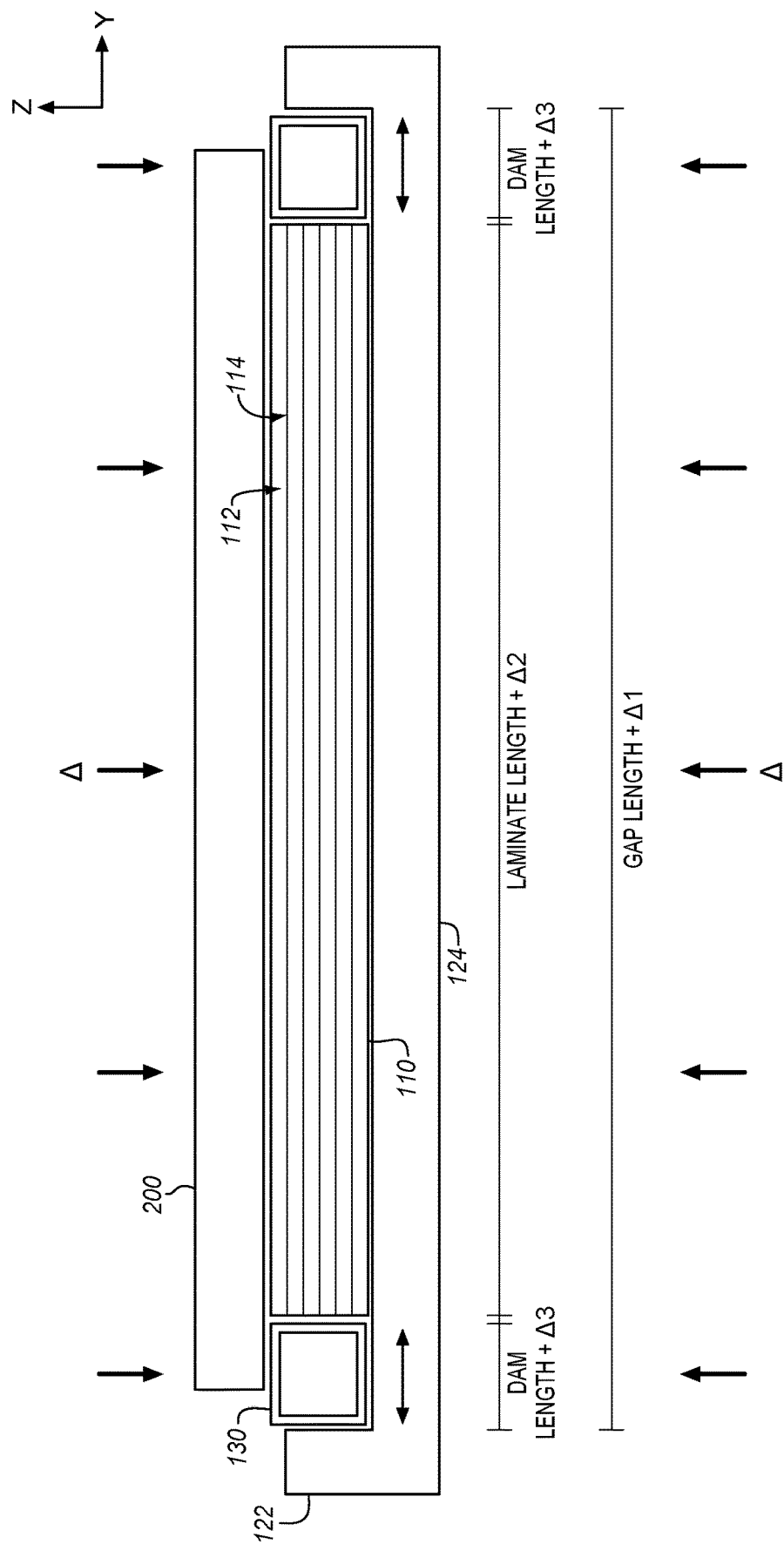
FIG. 4 is a cut-through view of heat being applied to a composite fabrication system in an illustrative embodiment.

FIG. 4 illustrates the heating process in an illustrative embodiment, and corresponds with view arrows 2 of FIG. 1. FIG. 4 illustrates that when composite fabrication system 100 is heated, a distance between side walls 122 increases to gap length+$\Delta 1$, laminate 110 increases to in length to laminate length+$\Delta 2$, and edge dams increase in length to dam length+$\Delta 3$. In these instances, $\Delta$ indicates an amount of increased length or decreased length. The changes in length for edge dams 130 may be selected (i.e., based on CTE and geometry) to ensure that edge dams 130 continue to abut laminate 110 and side walls 122 for at the temperature range between a glass transition point and a melting point of thermoplastic resin 112. For example, edge dams 130 may be dimensioned to have lengths along Y and CTEs that cause $\Delta 3$ to equal half the quantity of $\Delta 1 - \Delta 2$.

Maintaining contact between edge dams 130 and laminate 110 during fabrication ensures that thermoplastic resin 112 does not leak out of laminate 110 (because edge dams 130 physically block the flow of thermoplastic resin 112). At the same time, edge dams 130 ensure that side walls of mandrel 120 do not apply stresses to laminate 110 during heating or cooling, because edge dams 130 ensure that side walls 122 do not contact laminate 110 or press into laminate 110. Specifically, it is desirable to ensure that mandrel 120 does not apply compressive loads to laminate 110 during curing. This feature may be particularly desirable during the time period when laminate 110 is cooled from the melting point to the glass transition point. This ensures that laminate 110, when hardened into a composite part, is not subject to any undesired internal stresses that would have resulted from mandrel 120 having applied compressive loads during curing.

Method 300 provides a substantial advantage over prior techniques, because it utilizes edge dams 130 in a manner that ensures that stresses are not applied to a composite part during formation of that composite part, which is highly desirable.

Figure 5:
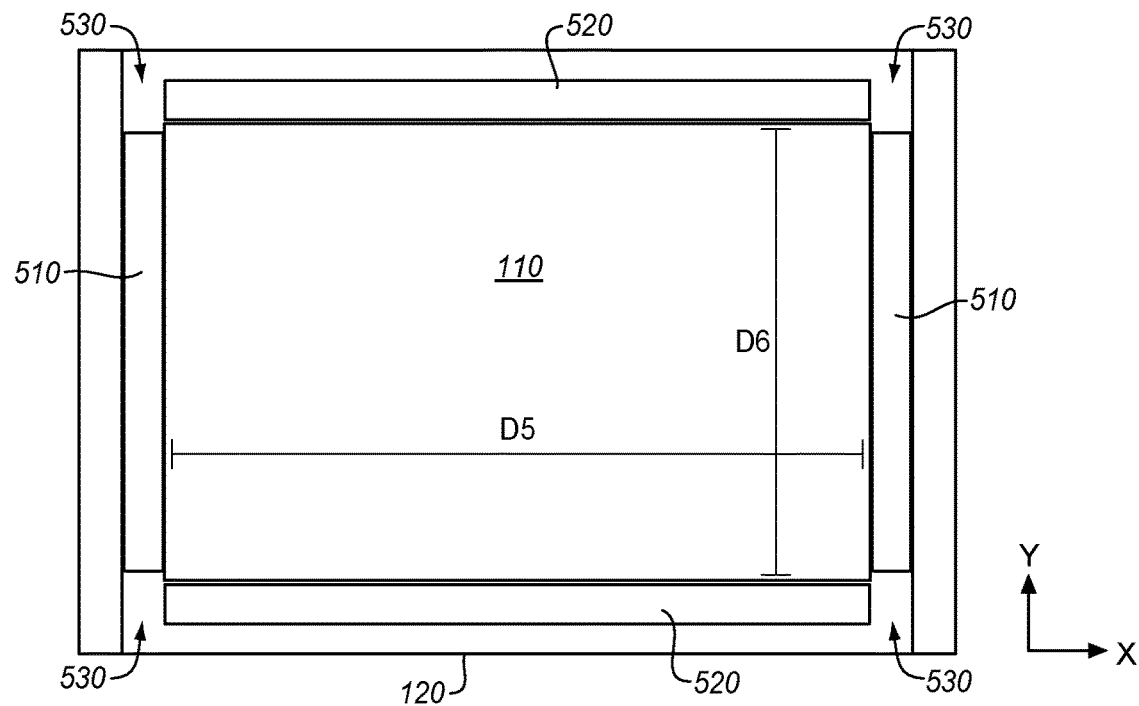
FIGS. 5-6 are top views illustrating arrangements of edge dams for a composite fabrication system in an illustrative embodiment.
Figure 6:
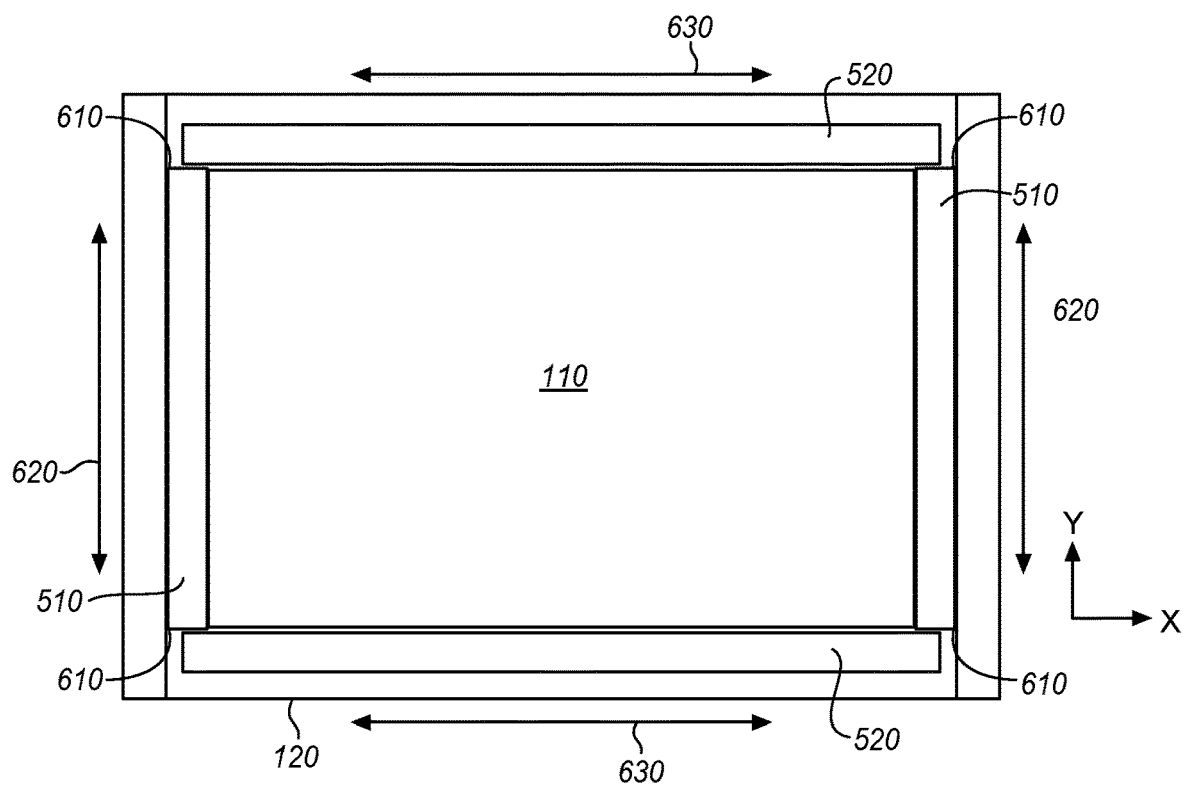

FIGS. 5-6 are top views illustrating arrangements of edge dams for a composite fabrication system in an illustrative embodiment. Specifically, FIGS. 5-6 correspond with view arrows 5 of FIG. 1, and illustrate edge dams placed around an entire perimeter of a laminate 110. In FIG. 5, edge dams 510 and edge dams 520 have not thermally expanded at mandrel 120, while in FIG. 6, edge dams 510 and edge dams 520 have thermally expanded at mandrel 120. In this embodiment, edge dams 510 are placed a distance D5 apart with respect to the X direction, while edge dams 520 are placed a distance D6 apart with respect to the Y direction. This leaves gaps 530 between edge dams 510 and edge dams 520 before heating occurs. The axial span 620 of each edge dam 510 and the axial span 630 of each edge dam 520 is selected so that at the completion of thermal expansion (i.e., at the hottest temperature achieved during fabrication), ends 610 of edge dams 510 abut, but do not apply force to displace, edge dams 520. The edge dams 510 and the edge dams 520 may also increase in axial width, length, and/or depth and their increase may be designed to ensure that ends 610 abut but do not apply force to edge dams 520.

EXAMPLES

In the following examples, additional processes, systems, and methods are described in the context of a composite fabrication system.

Figure 7:
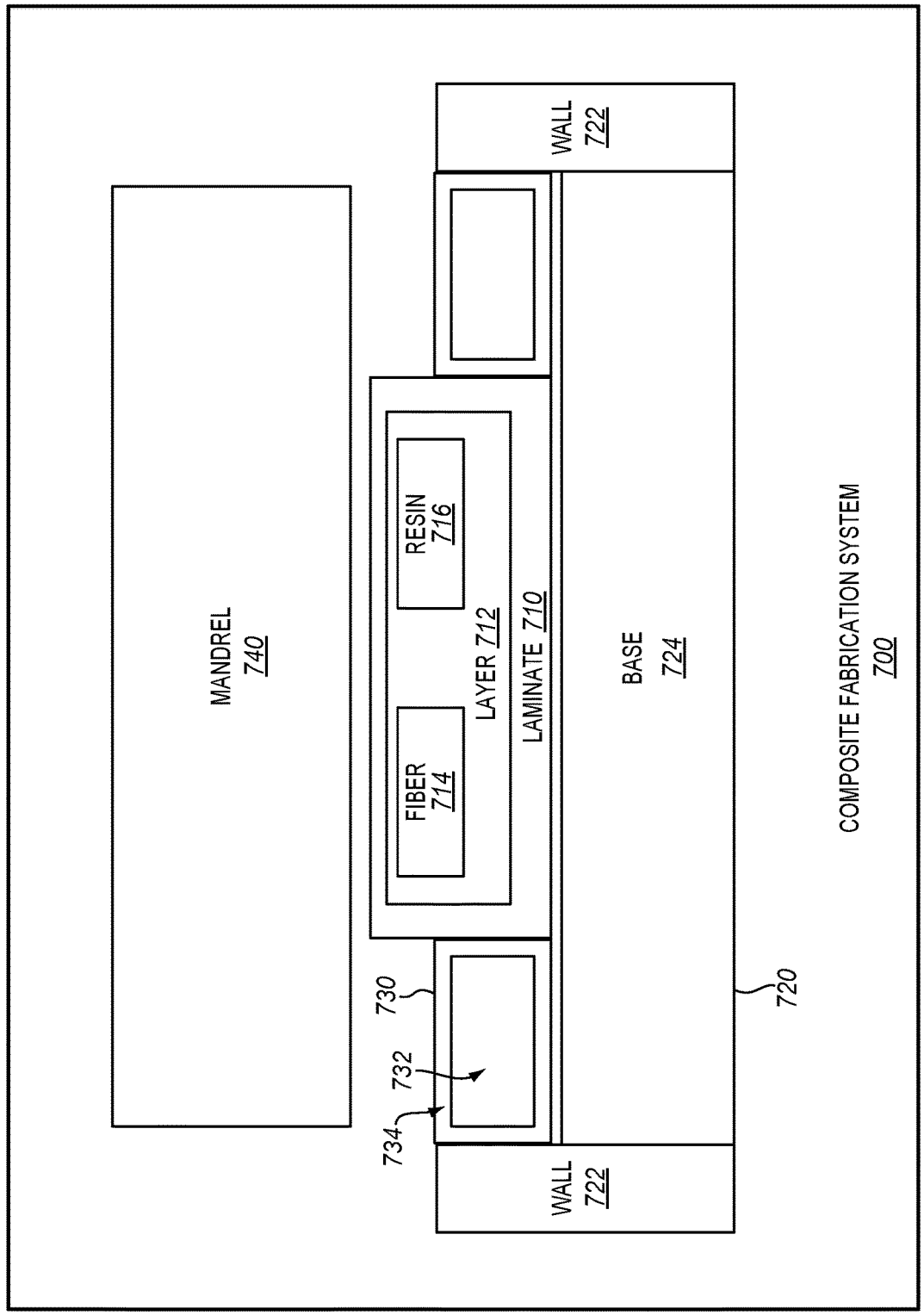
FIG. 7 is a block diagram of a composite fabrication system in an illustrative embodiment.

FIG. 7 is a block diagram of a composite fabrication system 700 in an illustrative embodiment. Composite fabrication system 700 includes mandrel 720, having base 724 and side walls 722. Laminate 710 is placed atop base 724, and includes one or more layers 712 of fiber 714 and resin 716. Edge dams 730 are placed onto base 724 between laminate 710 and side walls 722. Each edge dam 730 includes thermoplastic resin 732, and flexible seal 734. Flexible seal 734 holds thermoplastic resin 732 in place in the event that thermoplastic resin 732 melts. Broadly speaking the components enable the use of lower cost tooling (e.g., having mismatched CTEs) in composite fabrication, by compensating with a space filler edge dam. The edge dam material is sized and shaped to compensate for the mismatched CTE during heat up and cure whether the resin is thermoset or thermoplastic.)

Mandrel 740 is disposed above laminate 710, and may apply force against laminate 710 that presses laminate 710 into a desired shape during fabrication. For example, mandrel 740 may apply force after thermoplastic resin 716 has melted, in order to conform laminate 710 into a desired shape. In further embodiments, mandrel 720 and/or mandrel 740 may be contoured.

Figure 8:
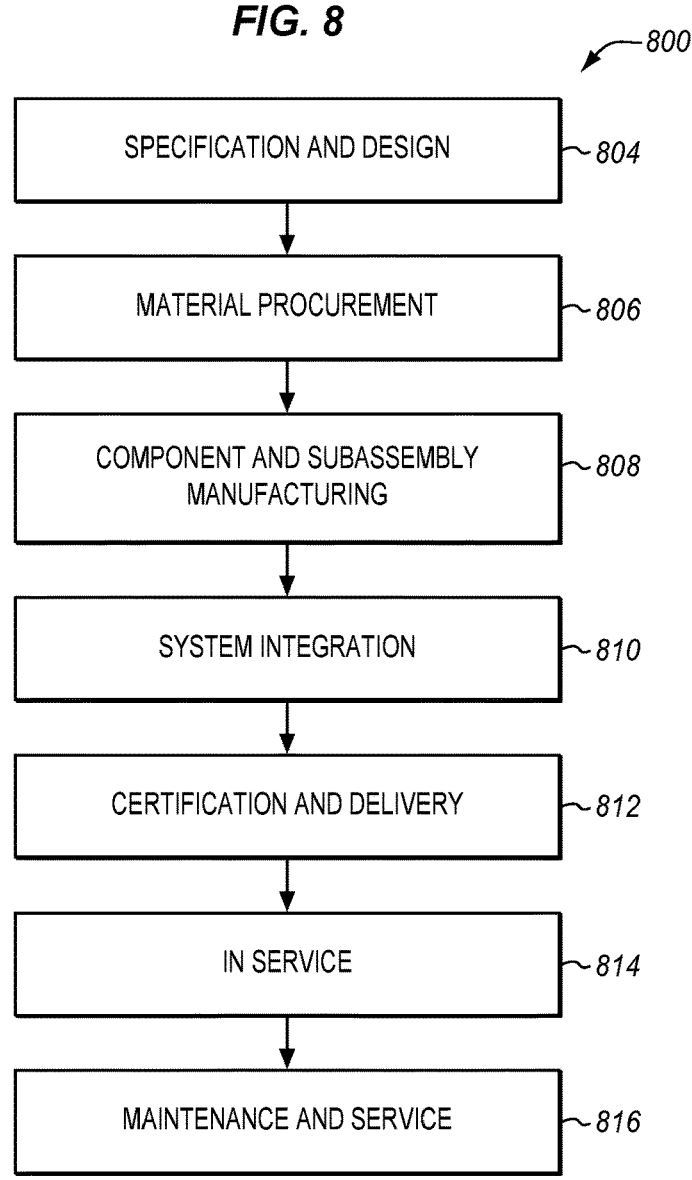
FIG. 8 is a flow diagram of aircraft production and service methodology in an illustrative embodiment.
Figure 9:
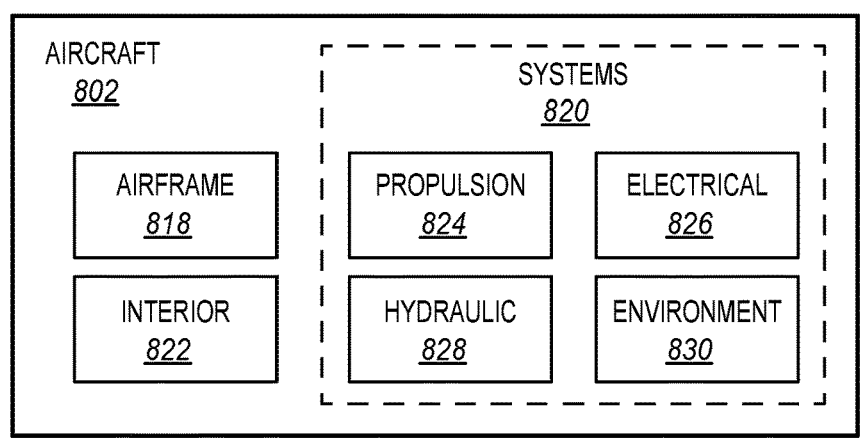
FIG. 9 is a block diagram of an aircraft in an illustrative embodiment.

Referring more particularly to the drawings, embodiments of the disclosure may be described in the context of aircraft manufacturing and service in method 800 as shown in FIG. 8 and an aircraft 802 as shown in FIG. 9. During preproduction, method 800 may include specification and design 804 of the aircraft 802 and material procurement 806.

During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on). Apparatus and methods embodied herein may be employed during any one or more suitable stages of the production and service described in method 800 (e.g., specification and design 804, material procurement 806, component and subassembly manufacturing 808, system integration 810, certification and delivery 812, service 814, maintenance and service 816) and/or any suitable component of aircraft 802 (e.g., airframe 818, systems 820, interior 822, propulsion system 824, electrical system 826, hydraulic system 828, environmental system 830).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by method 800 may include an airframe 818 with a plurality of systems 820 and an interior 822. Examples of systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 800. For example, components or subassemblies corresponding to component and subassembly manufacturing 808 may be fabricated or manufactured in a manner similar to components or subassemblies produced while the aircraft 802 is in service. Also, one or more apparatus embodiments, method embodiments, or a combination thereof may be utilized during component and subassembly manufacturing 808 and system integration 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816. For example, the techniques and systems described herein may be used for material procurement 806, component and subassembly manufacturing 808, system integration 810, service 814, and/or maintenance and service 816, and/or may be used for airframe 818 and/or interior 822. These techniques and systems may even be utilized for systems 820, including for example propulsion system 824, electrical system 826, hydraulic system 828, and/or environmental system 830.

In one embodiment, a part comprises a portion of airframe 818, and is manufactured during component and subassembly manufacturing 808. The part may then be assembled into an aircraft in system integration 810, and then be utilized in service 814 until wear renders the part unusable. Then, in maintenance and service 816, the part may be discarded and replaced with a newly manufactured part. Inventive components and methods may be utilized throughout component and subassembly manufacturing 808 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
   placing a laminate onto a base of a tool, the base being contained between side walls of the tool;
   placing edge dams onto the base between the side walls and the laminate that each abut the laminate and abut one of the side walls, each edge dam having a Coefficient of Thermal Expansion (CTE) greater than a CTE of the tool, the CTE of the tool being greater than a CTE of the laminate;
   heating the laminate, edge dams, and tool; and
   during the heating, thermally expanding the edge dams an amount that corresponds with a difference in thermal expansion between the laminate and the tool.

2. The method of claim 1 wherein:
   heating the laminate, edge dams, and tool heats the laminate, edge dams, and tool to at least a glass transition point of a thermoplastic resin within the laminate.

3. The method of claim 1 wherein:
   each edge dam has a CTE that corresponds with a CTE of a thermoplastic resin within the laminate.

4. The method of claim 1 wherein:
   during the heating, the edge dams continue to abut the laminate and abut one of the side walls.

5. The method of claim 1 wherein:
   thermally expanding the edge dams comprises increasing a length of each edge dam by a quantity equal to: half of the difference between an amount of increased length of the tool and an amount of increased length of the laminate.

6. The method of claim 1 wherein:
   thermally expanding the edge dams comprises increasing a width of each edge dam by a quantity equal to: half of the difference between an amount of increased width of the tool and an amount of increased width of the laminate.

7. The method of claim 1 wherein:
   thermally expanding the edge dams by an amount that corresponds with the difference in thermal expansion between the laminate and the tool is performed between a glass transition point of a thermoplastic resin within the laminate and a melting point of the thermoplastic resin.

8. The method of claim 1 wherein:
   the laminate includes a thermoplastic resin, and heating the laminate increases a temperature of the laminate above a melting point of the thermoplastic resin.

9. The method of claim 1 wherein:
   the laminate includes a thermoplastic resin, and the method further comprises cooling the laminate below a glass transition point of the thermoplastic resin.

10. The method of claim 1 wherein:
    the edge dams include a thermoplastic resin, and the method further comprises melting the thermoplastic resin within the edge dams while performing the heating.

11. The method of claim 1 further comprising:
    disposing a second tool above the laminate.

12. The method of claim 11 further comprising:
    pressing the laminate into a desired shape by applying force via the second tool.

13. The method of claim 11 wherein:
    pressing the laminate is performed after a thermoplastic resin of the laminate has melted.

14. The method of claim 11 wherein:
    the second tool is contoured.

15. The method of claim 1 wherein:
    the tool is contoured.

16. A method comprising:
    compensating for a disparity in thermal expansion between a laminate having a first Coefficient of Thermal Expansion (CTE), and a tool having a second CTE, by:
    placing edge dams at a base of the tool that is contained by sidewalls of the tool, between the side walls of the tool and the laminate that each abut the laminate and abut the tool, each edge dam having a third CTE that is greater than the first CTE exhibited by the laminate and less than the second CTE exhibited by the tool.

17. The method of claim 16 further comprising:
    during heating, thermally expanding the edge dams an amount that corresponds with a difference in thermal expansion between the laminate and the tool to ensure that the edge dams continuously abut the laminate and the tool.

18. The method of claim 16 wherein:
    heating increases a temperature of the laminate to at least a glass transition point of a thermoplastic resin within the laminate.

19. The method of claim 16 wherein:
    each edge dam has a CTE that corresponds with a CTE of a thermoplastic resin within the laminate.

20. The method of claim 16 wherein:
during heating, the edge dams continue to abut the laminate and abut the tool.

\* \* \* \* \*